(12) United States Patent
Sakuma (10) Patent No.: US 10,477,051 B2
(45) Date of Patent: Nov. 12, 2019

(54) READING KIT AND IMAGE READING APPARATUS

(71) Applicant: CANON KABUSHIKI KAISHA, Tokyo (JP)

(72) Inventor: Tomofumi Sakuma, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/718,544

(22) Filed: Sep. 28, 2017

(65) Prior Publication Data
US 2018/0103168 A1  Apr. 12, 2018

(30) Foreign Application Priority Data
Oct. 7, 2016  (JP) .................................. 2016-199329

(51) Int. Cl.
  *H04N 1/00*  (2006.01)
  *H04N 1/407*  (2006.01)
(52) U.S. Cl.
  CPC ....... *H04N 1/00801* (2013.01); *H04N 1/0066* (2013.01); *H04N 1/4072* (2013.01); *H04N 1/4076* (2013.01); *H04N 1/00591* (2013.01); *H04N 1/00599* (2013.01)
(58) Field of Classification Search
  CPC ............. H04N 1/00801; H04N 1/4076; H04N 1/4072; H04N 1/0066; H04N 1/00591; H04N 1/00599
  See application file for complete search history.

(56) References Cited

U.S. PATENT DOCUMENTS

| | | | |
|---|---|---|---|
| 2004/0179242 A1 | 9/2004 | Nakaya | 358/461 |
| 2006/0023267 A1 | 2/2006 | Ikeno et al. | 358/474 |
| 2013/0258422 A1 | 10/2013 | Yamamoto | 358/474 |
| 2015/0381854 A1 | 12/2015 | Horiguchi | 358/406 |

FOREIGN PATENT DOCUMENTS

| | | |
|---|---|---|
| CN | 1531328 | 9/2004 |
| CN | 1783937 | 6/2006 |
| CN | 103369199 | 10/2013 |
| CN | 105282379 | 1/2016 |
| JP | 2011-151478 | 8/2011 |

OTHER PUBLICATIONS

CN Office Action dated May 24, 2019 in counterpart CN Application No. 201710912814.6 with English translation.

*Primary Examiner* — Christopher Wait
(74) *Attorney, Agent, or Firm* — Venable LLP (57) ABSTRACT

Provided is a reading kit including a reading unit configured to read an image of an original being conveyed in a predetermined direction at a predetermined reading position, and a white reference sheet comprising a white reference portion to be read by the reading unit and an engaged portion to be engaged with a positioning member. The white reference portion being arranged at the predetermined reading position by engaging the engaged portion with the positioning member.

31 Claims, 10 Drawing Sheets

READING KIT AND IMAGE READING APPARATUS

BACKGROUND OF THE INVENTION

Field of the Invention

The present invention relates to an image reading apparatus configured to read an image formed on an original (hereinafter referred to as "original image") and a reading kit including a reading unit of an image reading apparatus and a white reference sheet.

Description of the Related Art

A copying machine and a multifunction printer include an image reading apparatus for reading an image from an original. There is proposed an image reading apparatus configured to read both a front surface and a back surface of the original at a time in order to read an original image at high speed and to reduce or prevent damage to the original due to conveyance of the original. In Japanese Patent Application Laid-open No. 2011-151478, there is disclosed an image reading apparatus including a first reading unit configured to read one surface of an original and a second reading unit configured to read another surface of the original, and capable of reading both the front surface and the back surface of the original at a time. The image reading apparatus includes a reader including the first reading unit and an auto document feeder (ADF) including the second reading unit and configured to convey the original. A white reference member for conducting shading correction by the second reading unit is provided at a position opposed to the second reading unit across a conveyance path for the original via a transparent member provided between the white reference member and the conveyance path. The transparent member achieves a configuration that prevents the white reference member and the original from being brought into contact with each other and therefore enables the white reference member to be hardly stained.

The second reading unit is configured to apply light from a light source to the white reference member and to receive light reflected by the white reference member by a light receiver, to thereby read the white reference member. The image reading apparatus is configured to conduct the shading correction based on a result of the reading. When the light source is set at a position farther from the white reference member than from the reading position of the original provided on the conveyance path, the applied light disperses to a larger degree than when the original is read. Therefore, the white reference member exhibits a smaller amount of the applied light, as well as a smaller amount of the reflected light, in both end portions of the second reading unit in a main scanning direction than in a central portion of the second reading unit in the main scanning direction. For that reason, when the white reference member arranged at the position farther than the reading position of the original is used to calculate a shading coefficient, brightnesses in both end portions in the main scanning direction are lower than a brightness in the central portion, and hence the shading coefficients for both end portions become higher than the shading coefficient for the central portion. When the shading correction is conducted through use of such shading coefficients, the brightnesses in both end portions in the main scanning direction become higher than the brightness in the central portion. That is, accurate shading correction is hard to conduct when there is a difference between a distance from the second reading unit to the reading position of the original and a distance from the second reading unit to the white reference member. Therefore, in Japanese Patent Application Laid-open No. 2011-151478, a white reference chart having a sheet shape is conveyed and read by the second reading unit, to thereby allow the accurate shading correction.

When the white reference chart having a sheet shape is conveyed and read, the white reference chart may fail to be sufficiently restrained, which leads to an unstable reading surface of the white reference chart. In this case, the white reference chart is not accurately read, and the shading correction deteriorates in precision. The deterioration in precision of the shading correction causes image unevenness or other such read image defect of an original image that has been read.

The present invention has been made in view of the above-mentioned problem, and has an object to provide a reading kit capable of conducting accurate shading correction even when a white reference member is arranged at a position different from a reading position of an original.

SUMMARY OF THE INVENTION

A reading kit according to the present disclosure includes a reading unit configured to read an image of an original being conveyed in a predetermined direction at a predetermined reading position; and a white reference sheet comprising a white reference portion to be read by the reading unit and an engaged portion to be engaged with a positioning member, the white reference portion being arranged at the predetermined reading position by engaging the engaged portion with the positioning member.

Further features of the present invention will become apparent from the following description of exemplary embodiments (with reference to the attached drawings).

DESCRIPTION OF THE EMBODIMENTS

Now, embodiments of the present invention are described below in detail with reference to the accompanying drawings.

Overall Configuration

Figure 1:
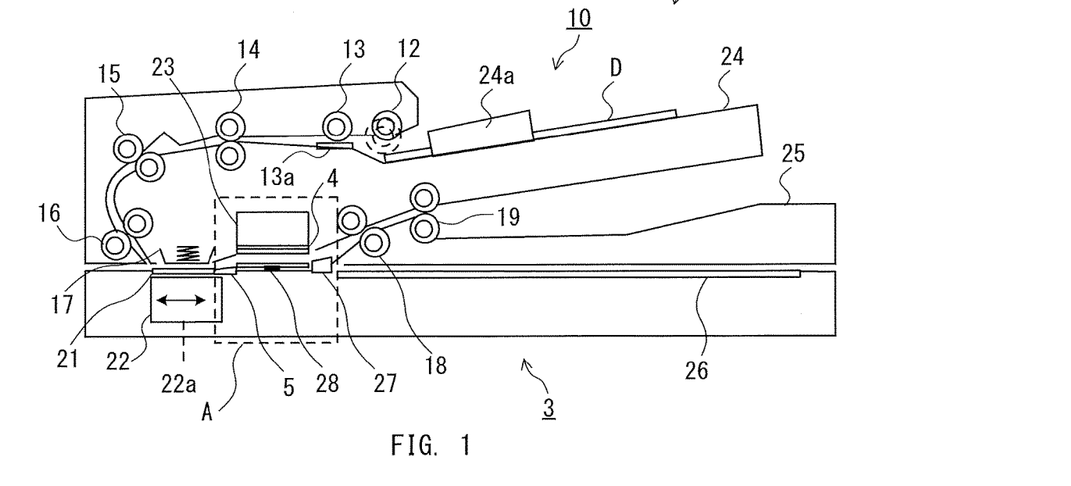
FIG. 1 is a configuration diagram of an image reading apparatus.

FIG. 1 is a configuration diagram of an image reading apparatus provided with an automatic document feeding mechanism. An image reading apparatus 1 includes: a reader 3 including a first reading unit 22 configured to read an original image on one surface of an original D; and an auto document feeder (hereinafter referred to as "ADF") 10 including a second reading unit 23 configured to read an original image on another surface of the original D. The ADF 10 is provided to the reader 3 so as to be openable and closable. During shading correction, the ADF 10 is in a closed state.

The ADF 10 includes an original tray 24 on which originals D that have not been read are to be stacked, a delivery tray 25 to which the original D that has been read is to be delivered, and a conveyance path for the original D from the original tray 24 to the delivery tray 25. The original D is conveyed from the original tray 24 to the delivery tray 25 through a reading position to be used by the first reading unit 22 and a reading position to be used by the second reading unit 23, which are located on the conveyance path. The image reading apparatus 1 is configured to read the original images on both surfaces of the originals D by the first reading unit 22 and the second reading unit 23, which have been conveyed to the respective reading positions. In the following description, a surface from which the original image is to be read by the first reading unit 22 is referred to as "front surface", and a surface from which the original image is to be read by the second reading unit 23 is referred to as "back surface".

The reader 3 includes an original table glass 26 configured to allow the original D to be placed thereon. The first reading unit 22 is capable of reciprocating in parallel with the original table glass 26 (in a direction indicated by the arrow of FIG. 1) by a driving mechanism (not shown). The driving mechanism is configured to cause the first reading unit 22 to reciprocate by being rotated in forward and backward directions with respect to a home position of the first reading unit 22. When the original image is read without use of the ADF 10, the original D is placed on the original table glass 26 with the front surface facing toward the first reading unit 22 side. The ADF 10 is openable and closable with respect to the reader 3, and hence the user is allowed to lift up the ADF 10 to place the original D on the original table glass 26. The first reading unit 22 can read the original image on the entire front surface of the original D while reciprocating. The driving mechanism includes, for example, a stepping motor, and a rotation amount of the stepping motor is determined based on an input pulse count. Therefore, the position of the first reading unit 22 is controlled based on the pulse count to be input to the driving mechanism.

The first reading unit 22 is also capable of reading the original image from the original D conveyed by the ADF 10 in addition to the original D placed on the original table glass 26. In this specification, an operation mode for reading the original image from the original D placed on the original table glass 26 is referred to as "fixed reading mode", and an operation mode for reading the original image from the original D being conveyed by the ADF 10 is referred to as "flow reading mode". Each operation mode is set by, for example, the image reading apparatus 1 detecting a position at which the original D is placed. As described above, in the fixed reading mode, the first reading unit 22 is moved. The first reading unit 22 includes a light emitter and a light receiver that are each arranged so as to have a line shape in a direction perpendicular to a moving direction. Therefore, the first reading unit 22 uses a direction in which the light emitter and the light receiver are arranged as a main scanning direction, and uses the moving direction as a sub-scanning direction.

In the flow reading mode, the first reading unit 22 stops at a position 22a. A flow reading glass 21 is provided on the ADF 10 side of the first reading unit 22. The reading position of the first reading unit 22 falls on the flow reading glass 21. The original D conveyed along the conveyance path by the ADF 10 has the front surface read by the first reading unit 22 while passing through a position on the flow reading glass 21.

A configuration of the ADF 10 is described below. As described above, the ADF 10 includes the original tray 24, the conveyance path, and the delivery tray 25. The original tray 24 includes a pair of regulating plates 24a provided slidably in a direction (width direction) perpendicular to a conveyance direction of the original D. The pair of regulating plates 24a are configured to regulate the width direction of the originals D stacked on the original tray 24, and to align the positions of the originals D in the width direction. A pickup roller 12, a separation roller 13, a drawing roller pair 14, a registration roller pair 15, a first lead roller pair 16, a second lead roller pair 18, and a delivery roller pair 19 are provided along the conveyance path.

The pickup roller 12 is configured to rotate in conjunction with the separation roller 13 to take the originals D stacked on the original tray 24 into the ADF 10. The pickup roller 12 normally waits above the original tray 24, which is a home position, so as not to hinder the user from placing the original D on the original tray 24. When the original D is taken in, the pickup roller 12 moves down (to a position indicated by the broken line) to be brought into abutment with the original D. To that end, the pickup roller 12 has a shaft supported by an arm (not shown) so as to rise and fall as the arm swings.

The separation roller 13 is configured to separate the originals D taken in by the pickup roller 12 from each other, and to convey the original D to the drawing roller pair 14 along the conveyance path. A separation pad 13a is provided at a position opposed to the separation roller 13 across the conveyance path. The separation pad 13a is configured to be brought into press contact with the separation roller 13 to separate the originals D fed from the pickup roller 12 from each other in cooperation with the separation roller 13.

The drawing roller pair 14 is configured to convey the original D separated from another original D by the separation roller 13 to the registration roller pair 15. The registration roller pair 15 is configured to correct skew feeding of the original D, and to convey the original D to the first lead roller pair 16. The first lead roller pair 16 is configured to convey the original D to the second lead roller pair 18 through the reading position of the first reading unit 22 and the reading position of the second reading unit 23. As described above, the flow reading glass 21 is provided at the reading position of the first reading unit 22. A reading glass 4 is provided at the reading position of the second reading unit 23. The original D has the original image on the front surface read at the reading position of the first reading unit 22, and has the original image on the back surface read at the reading position of the second reading unit 23. The second lead roller pair 18 is configured to convey the original D that has passed through the respective reading positions to the delivery roller pair 19. The delivery roller pair 19 is configured to deliver the original D to the delivery tray 25.

A jump stand 5 configured to scoop up the original D that has passed through the flow reading glass 21 (reading position) is provided on downstream of the flow reading glass 21 in the conveyance direction. The original D having the original image on the front surface read by the first reading unit 22 is guided to the reading position of the second reading unit 23 by the jump stand 5. A slope member 27 configured to scoop up the original D that has passed through the reading position of the second reading unit 23 is provided on downstream of the reading position in the conveyance direction. The original D having the original image on the back surface read by the second reading unit 23 is guided to the second lead roller pair 18 by the slope member 27. In the flow reading mode, the original D has the original images on both surfaces read by the first reading unit 22 and the second reading unit 23 during one conveyance operation. Therefore, the original D does not have the front surface and back surface subjected to reverse conveyance, and has the original image on both surfaces read for a short period of time with a minimum conveyance amount.

The second reading unit 23 has the same configuration as that of the first reading unit 22, and includes a light emitter and a light receiver that are each arranged so as to have a line shape in a direction perpendicular to the conveyance direction of the original D. The moving direction of the first reading unit 22 is the same as the conveyance direction of the original D. Therefore, the first reading unit 22 and the second reading unit 23 use the direction perpendicular to the conveyance direction as the main scanning direction, and use the conveyance direction as the sub-scanning direction.

The second reading unit 23 reads the original image at a timing when the original D is conveyed between the reading glass 4 and the conveyance path. A white reference member 28 for calculating a shading coefficient to be used for the shading correction is provided at a position opposed to the second reading unit 23 across the conveyance path. Therefore, the white reference member 28 is arranged at a position farther from the second reading unit 23 than the position at which the original D is actually to be read.

In this embodiment, the second reading unit 23 is formed of a contact image sensor (CIS). The second reading unit 23 includes a light emitter configured to apply light to the original D conveyed to the reading position, a light guiding body configured to guide and apply the light from the light emitter to the original D, a line sensor being a light receiver, and a lens configured to condense light reflected by the original D onto the line sensor. The light emitter is configured such that a plurality of light-emitting elements, for example, light emitting diodes (LEDs), are arranged in a straight line along the main scanning direction. The line sensor is the light receiver configured such that a plurality of light-receiving elements, for example, complementary metal oxide semiconductor (CMOS) image sensors, are arranged in a straight line along the main scanning direction in the same manner as the light receiver. The second reading unit 23 is configured to photo-electrically convert the light reflected by the original D and received by the line sensor, and to output an analog image signal being an analog electric signal corresponding to an amount of reflected and received light. The analog image signal has a value changed depending on a density of the original image. The second reading unit 23 is provided attachably and removably to/from the image reading apparatus 1.

Control System

Figure 2:
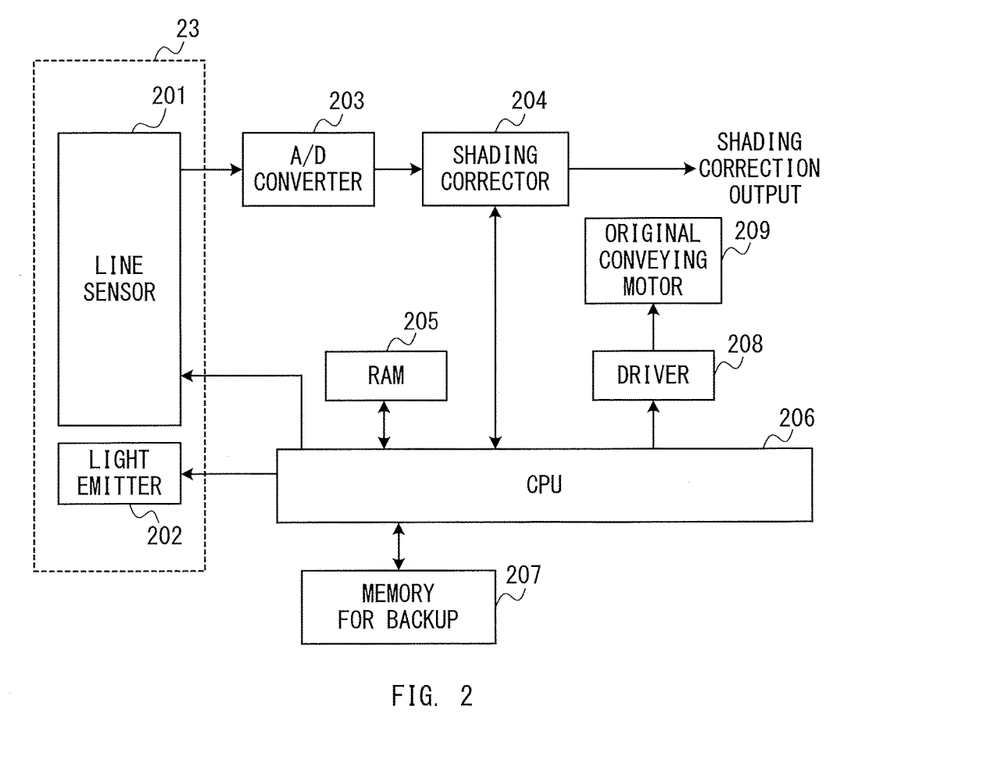
FIG. 2 is a configuration diagram of a control system.

FIG. 2 is a configuration diagram of a control system for controlling an operation of the image reading apparatus 1. The control system is built into the image reading apparatus 1. The description of the control system is directed to a configuration for conducting the shading correction on the second reading unit 23, but the first reading unit 22 can also be subjected to the shading correction by the control system having the same configuration. The control system is not only formed of discrete parts but also achieved by, for example, a one-chip semiconductor product. Examples of the one-chip semiconductor product include a micro-processing unit (MPU), an application specific integrated circuit (ASIC), and a system-on-a-chip (SOC).

The control system is configured to execute operation control of the image reading apparatus 1 by a central processing unit (CPU) 206. The CPU 206 is connected to the second reading unit 23, a driver 208, a memory 207 for backup, a random access memory (RAM) 205, and a shading corrector 204. The driver 208 is connected to an original conveying motor 209. In addition, the control system includes an A/D converter 203.

The CPU 206 is configured to conduct drive control of the original conveying motor 209 by the driver 208. The original conveying motor 209 is configured to rotationally drive the pickup roller 12, the separating roller 13, the drawing roller pair 14, the registration roller pair 15, the first lead roller pair 16, the second lead roller pair 18, and the delivery roller pair 19, which are provided along the conveyance path. The CPU 206 is configured to control the operation of each roller by the driver 208, to thereby convey the original D along the conveyance path.

The CPU 206 is configured to conduct light emission control of a light source 202 of the second reading unit 23, and to cause the line sensor 201 to output the analog image signal. The line sensor 201 inputs the analog image signal to the A/D converter 203. The A/D converter 203 is configured to convert the analog image signal input from the line sensor 201 into a digital image signal. The A/D converter 203 inputs the digital image signal to the shading corrector 204. The shading corrector 204 is configured to conduct the shading correction for suppressing an influence of nonuniformity in light amount of the light source 202 and an influence of unevenness in sensitivity of the light-receiving elements of the line sensor 201.

The memory 207 for backup is a non-volatile memory, and is configured to store different kinds of data required for the shading correction. The memory 207 for backup is configured to allow data to be written thereto and read therefrom by the CPU 206. The CPU 206 is configured to transmit and receive data between the memory 207 for backup and the shading corrector 204. The RAM 205 is configured to provide a temporary storage area to be used by the CPU 206 to conduct processing. In this embodiment, the RAM 205 is used to temporarily store data during the shading correction.

Shading Correction

A description is made of the shading correction conducted by the shading corrector 204. The analog image signal output from the line sensor 201 includes a brightness value of each of pixels along the main scanning direction. The digital image signal obtained by converting the analog image signal by the A/D converter 203 includes a digital value of the brightness value of each of the pixels along the main scanning direction. The shading corrector 204 is configured to conduct the shading correction through use of the digital value of the brightness value of each of the pixels along the main scanning direction as an original read value, to thereby derive a shading correction output value. The shading corrector 204 is configured to determine the shading correction output value based on, for example, the following expression.

(Shading correction output value) (*n*)=(original read value) (*n*)/(shading coefficient) (*n*)×(read target value)   (Expression 1)

n: a position of the pixel in the main scanning direction

Shading coefficient: a coefficient for conducting the shading correction

Read target value: a target value of a read value to be obtained when the white reference member 28 is read The shading coefficient is generated by the CPU 206 based on correlation data representing a correlation between illumination brightness distribution data obtained as a result of reading the white reference member 28 in the main scanning direction and illumination brightness distribution data obtained as a result of reading a white reference sheet described later in the main scanning direction. The correlation data and the read target value are stored in the memory 207 for backup. The shading corrector 204 is configured to acquire the shading coefficient from the CPU 206, and to acquire the read target value from the memory 207 for backup via the CPU 206.

Figure 3:
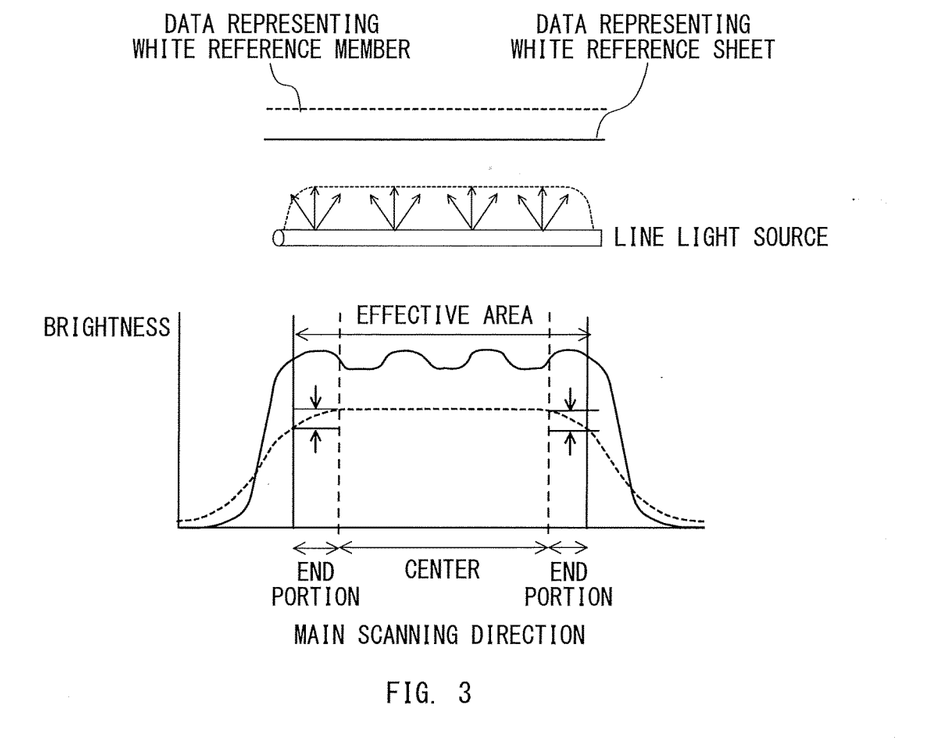
FIG. 3 is an explanatory diagram and an explanatory graph of illumination brightness distribution data.

FIG. 3 is an explanatory diagram and an explanatory graph of illumination brightness distribution data. The illumination brightness distribution data is data obtained as a result of conducting the reading by emitting light from the light emitter 202 being the line light source. The dotted line indicates a reading result of the white reference member 28, and the solid line indicates a reading result of the white reference sheet described later.

Figure 4:
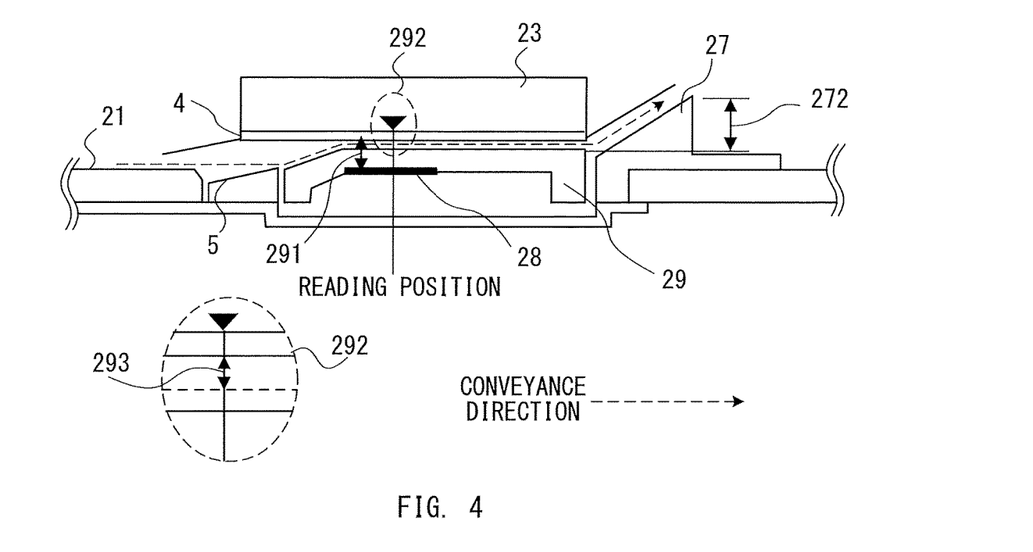
FIG. 4 is an explanatory diagram of a reading state of a white reference member.

FIG. 4 is an explanatory diagram of a reading state of the white reference member 28 by the second reading unit 23. A platen glass plate 29 being a transparent member is provided at the reading position of the second reading unit 23. The white reference member 28 is arranged behind the platen glass plate 29 when viewed from the second reading unit 23. The platen glass plate 29 achieves a configuration that enables the white reference member 28 to be hardly stained. The white reference member 28 is arranged at a position farther from the second reading unit 23 than the conveyance path for the original D by a thickness of the platen glass plate 29. In the example of FIG. 4, the white reference member 28 is arranged at the position apart from the second reading unit 23 by a distance 291 that is longer than a distance 293 from the conveyance path for the original D. Therefore, an absolute brightness of the light applied to the white reference member 28 is lower than an absolute brightness on the conveyance path. In addition, an optical path length between the second reading unit 23 and the white reference member 28 is longer than an optical path length between the second reading unit 23 and the conveyance path. Therefore, the light emitted from the second reading unit 23 is diffused in the main scanning direction, to thereby cause the illumination brightness distribution data obtained by reading the white reference member 28 to become data that is broad in the main scanning direction (indicated by the dotted line of FIG. 3).

Figure 5A:
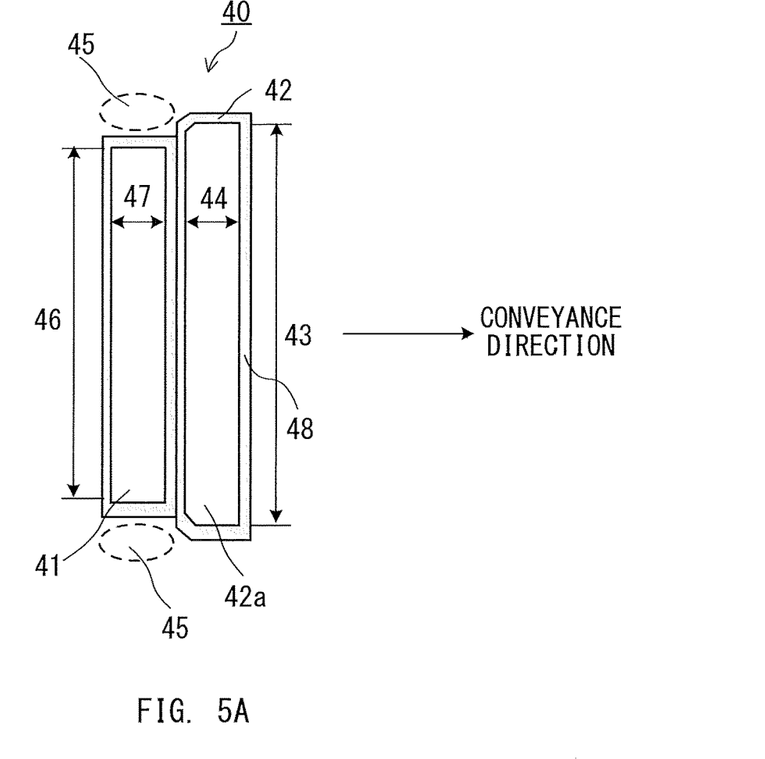
FIG. 5A and FIG. 5B are each an explanatory diagram of a white reference sheet.
Figure 5B:
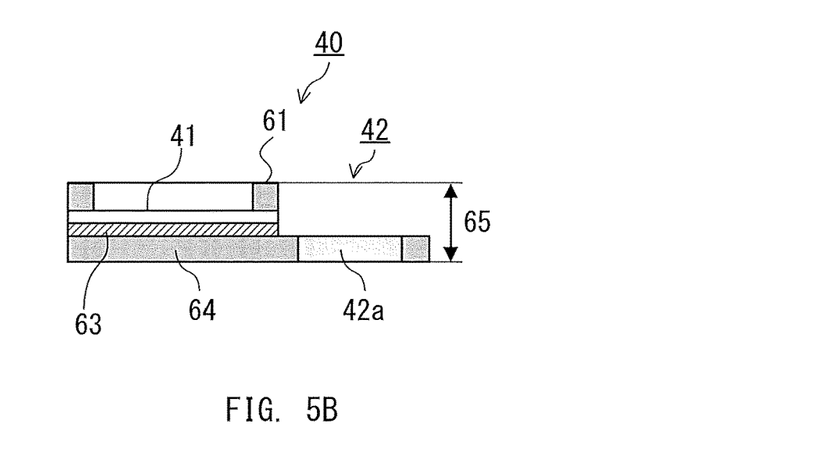

FIG. 5A and FIG. 5B are each an explanatory diagram of the white reference sheet. FIG. 5A is an overview of a white reference sheet 40. FIG. 5B is a sectional view of the white reference sheet 40. The white reference sheet 40 is a sheet-like member obtained by integrally forming a white reference portion 41 and an engaged portion 42. The white reference portion 41 includes a surface of a color (in this case, white) having a uniform density, which is to be read as a reference during the shading correction. The engaged portion 42 is engaged in the vicinity of the reading position of the second reading unit 23 in order to arrange the white reference portion 41 stably at the reading position of the second reading unit 23. The engaged portion 42 includes an opening 42a. When the white reference sheet 40 is mounted at the reading position of the second reading unit 23, the white reference portion 41 and the engaged portion 42 are located upstream and downstream, respectively, in the conveyance direction. At a time of factory shipment of the image reading apparatus 1 or when the second reading unit 23 is replaced, the white reference sheet 40 is mounted at the reading position of the second reading unit 23 by an operator. The second reading unit 23 and the white reference sheet 40 are an example of a reading kit. In that case, the engaged portion 42 determines the position of the white reference portion 41 so that the white reference portion 41 is accurately arranged at the reading position of the second reading unit 23. The white reference portion 41 is formed to have a shorter length in the main scanning direction than that of the engaged portion 42. Therefore, width differences 45 from the engaged portion 42 occur on both end sides of the white reference portion 41 in the main scanning direction. That is, the white reference portion 41 is formed to have a longitudinal dimension 46 in the main scanning direction shorter than a length 43 of the engaged portion 42 in the main scanning direction by two width differences 45.

The white reference portion 41 is formed on a silver film 63 for matting which is formed on an insulating substrate 64. An insulating member 61 is provided on the white reference portion 41 so that the white reference portion 41 is exposed. The engaged portion 42 is formed by forming the opening 42a in the insulating substrate 64 extending from below the white reference portion 41.

Figure 6A:
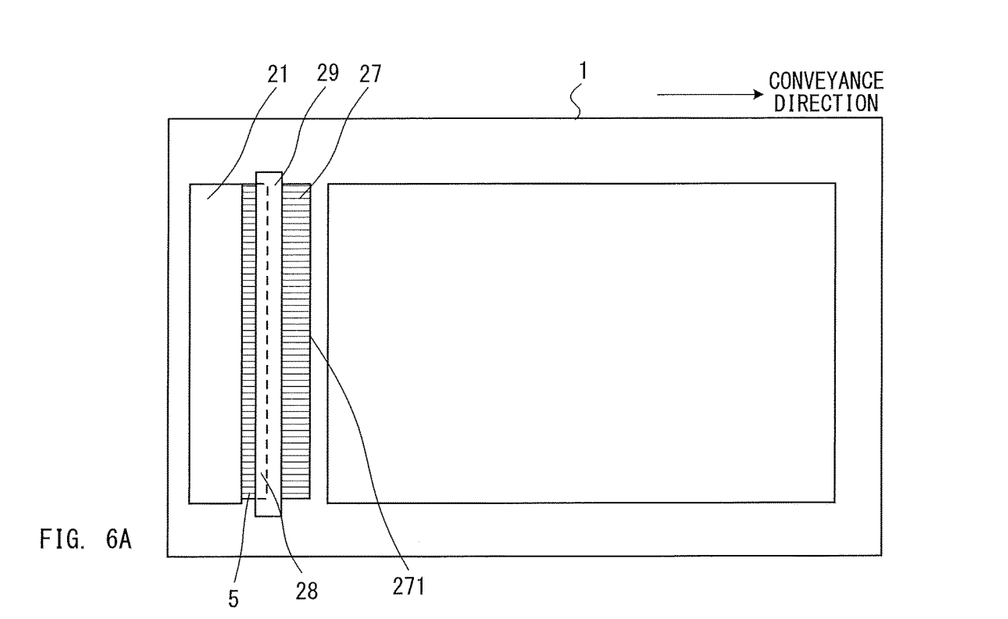
FIG. 6A and FIG. 6B are each an explanatory diagram of a mounted state of the white reference sheet.
Figure 6B:
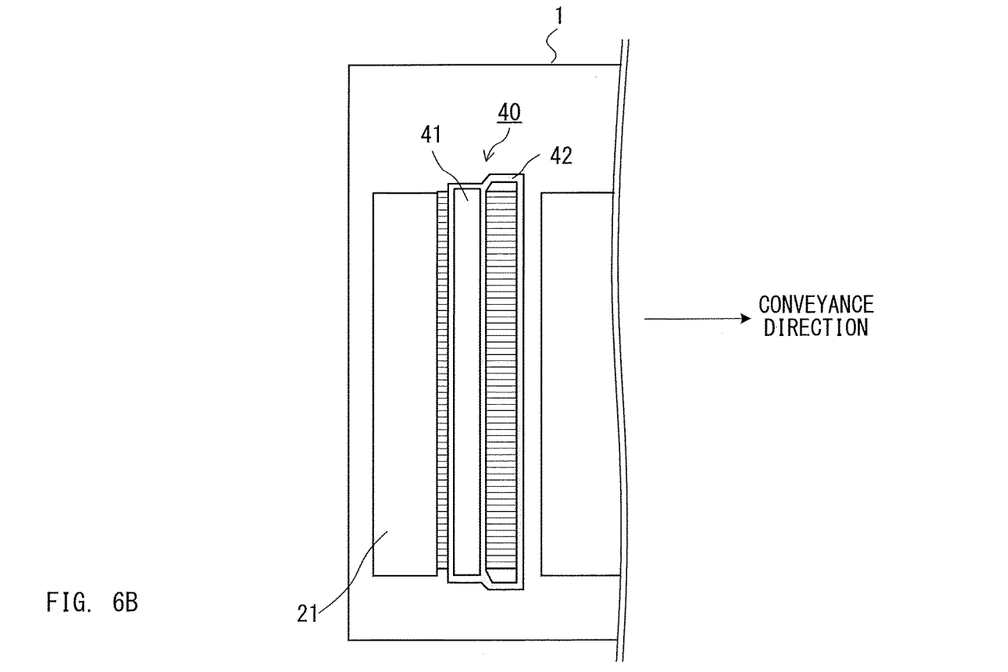

FIG. 6A and FIG. 6B are each an explanatory diagram of a mounted state of the white reference sheet 40 with respect to the reading position of the second reading unit 23. FIG. 6A is an illustration of the reading position on the conveyance path side when viewed from the second reading unit 23. In order from an upstream side of the original D in the conveyance direction, there are arranged the flow reading glass 21 and the jump stand 5, which are provided at the reading position of the first reading unit 22, and the platen glass plate 29 and the slope member 27, which are provided at the reading position of the second reading unit 23. The white reference member 28 is arranged behind the platen glass plate 29. FIG. 6B is an illustration of a state under which the white reference sheet 40 is mounted. When the white reference sheet 40 is placed at the reading position of the second reading unit 23, a longitudinal part 48 of the opening 42a of the engaged portion 42 is brought into abutment with a longitudinal part 271 of the slope member 27 by the operator. The engaged portion 42 is locked by having the slope member 27 fitted into the opening 42a. The slope member 27 is a positioning member provided in the vicinity of the reading position. With this configuration, the positioning is easily conducted on the white reference sheet 40 in the sub-scanning direction.

Figure 7A:
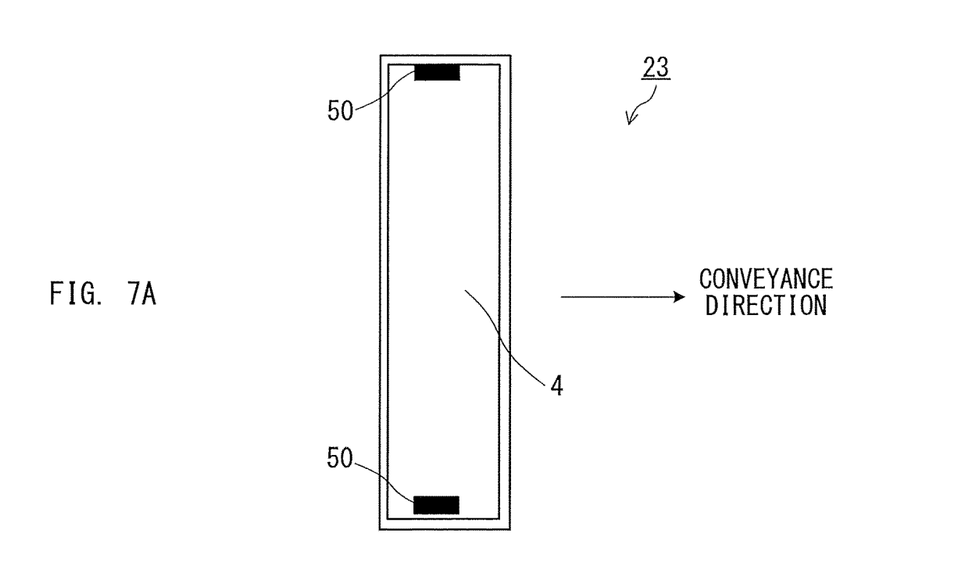
FIG. 7A, FIG. 7B, and FIG. 7C are each an explanatory diagram of the mounted state of the white reference sheet.
Figure 7B:
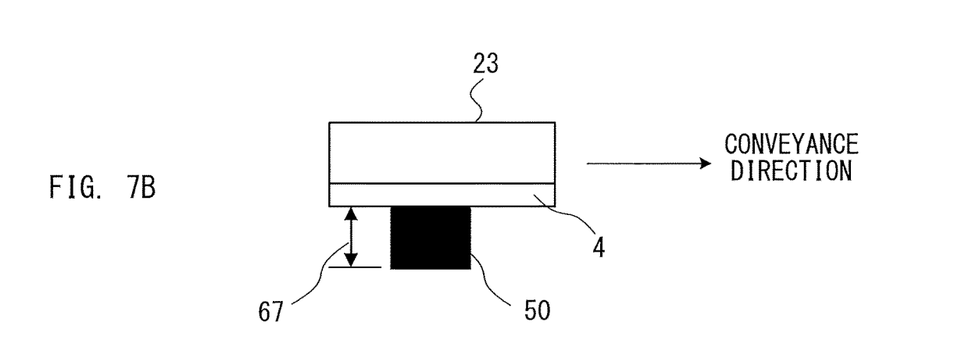
Figure 7C:
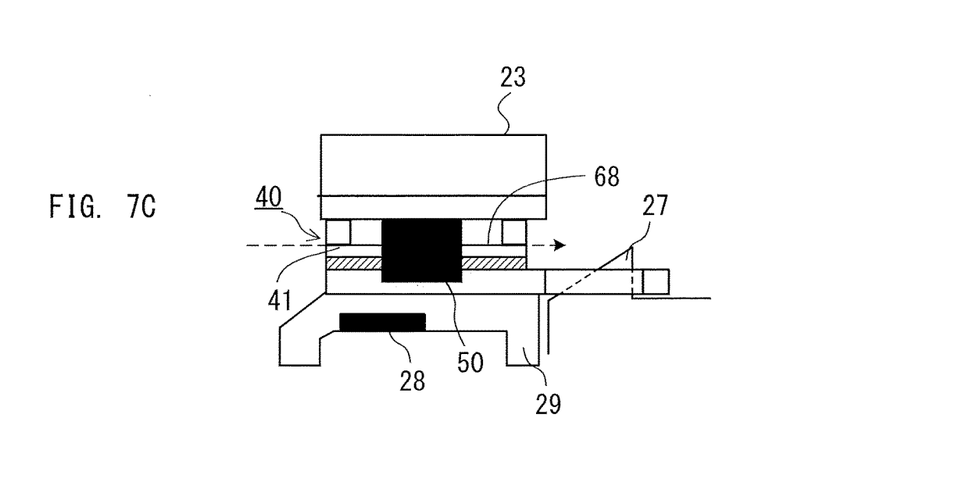

FIG. 7A to 7C are each an explanatory diagram of a mounted state of the white reference sheet 40 with respect to the reading position of the second reading unit 23. FIG. 7B and FIG. 7C are illustrations of states exhibited when viewed along the main scanning direction. FIG. 7A and FIG. 7B are illustrations of external appearances of the second reading unit 23. The second reading unit 23 includes a protruding member 50 in each of the both end portions in the main scanning direction. The protruding members 50 are configured to sit on the platen glass plate 29, to thereby secure a conveyance space for the original D. FIG. 7C is the illustration of the state under which the white reference sheet 40 is mounted. The white reference sheet 40 is configured so that a thickness 65 thereof illustrated in FIG. 5B is larger than the conveyance space. That is, the thickness 65 of the white reference sheet 40 is larger than a height 67 of the protruding member 50. This is because, in a case where the conveyance space is larger, corrugation or warpage may occur in the white reference portion 41 when the white reference sheet 40 is mounted, which may inhibit accurate shading correction. The width differences 45 of the white reference sheet 40 are defined so as to prevent the protruding member 50 from falling onto the mounted white reference sheet 40. In addition, the width differences 45 are defined at the positions to which the protruding members 50 are to be brought, and serve as opening portions into which the protruding members 50 are to be fitted when the white reference sheet 40 is mounted. The white reference sheet 40 has thicknesses of the insulating substrate 64 and the silver film 63 determined so that the white reference portion 41 is positioned on an original passage plane 68 along which the original D is to be conveyed when the white reference sheet 40 is mounted.

In this manner, the white reference sheet 40 is nipped between the second reading unit 23 and the platen glass plate 29. Therefore, the second reading unit 23 can read the white reference sheet 40 while correcting corrugation or warpage thereof, which achieves the accurate shading correction.

In the configuration, a distance 272 between a mounting surface of the platen glass plate 29 and a crest of the slope member 27, which is illustrated in FIG. 4, is set larger than the thickness 65 of the white reference sheet 40 so that the white reference portion 41 of the white reference sheet 40 is easily mounted on the platen glass plate 29. The white reference sheet 40 is positioned in the main scanning direction by having the slope member 27 fitted into the opening 42a of the engaged portion 42. The white reference sheet 40 is configured such that the white reference portion 41 is positively arranged at the reading position of the second reading unit 23 even in consideration of dimensional tolerances of respective parts. That is, the white reference sheet 40 is configured such that a transverse dimension 47 and the longitudinal dimension 46 of the white reference portion 41, which are illustrated in FIG. 5A, are larger than a transverse dimension and a longitudinal dimension of the white reference member 28.

A result of reading the white reference sheet 40 having such a configuration, which is mounted at the reading position of the second reading unit 23, has the following characteristics.

That is, the white reference portion 41 of the white reference sheet 40 is located on the original passage plane 68, and hence an absolute brightness of the light applied to the white reference portion 41 is higher than the absolute brightness of the light applied to the white reference member 28. In addition, the optical path length between the second reading unit 23 and the white reference portion 41 of the white reference sheet 40 is shorter than the optical path length between the second reading unit 23 and the white reference member 28. Therefore, the light emitted from the second reading unit 23 to the white reference portion 41 of the white reference sheet 40 is diffused in the main scanning direction with a diffusion amount smaller than in the case of the white reference member 28, and exhibits substantially the same brightness. As a result, the illumination brightness distribution data (indicated by the solid line of FIG. 3) obtained as a result of reading the white reference portion 41 of the white reference sheet 40 by the line light source exhibits substantially the same brightness in the central portion and the end portions in the main scanning direction.

Processing for Storing Correlation Data

Figure 8:
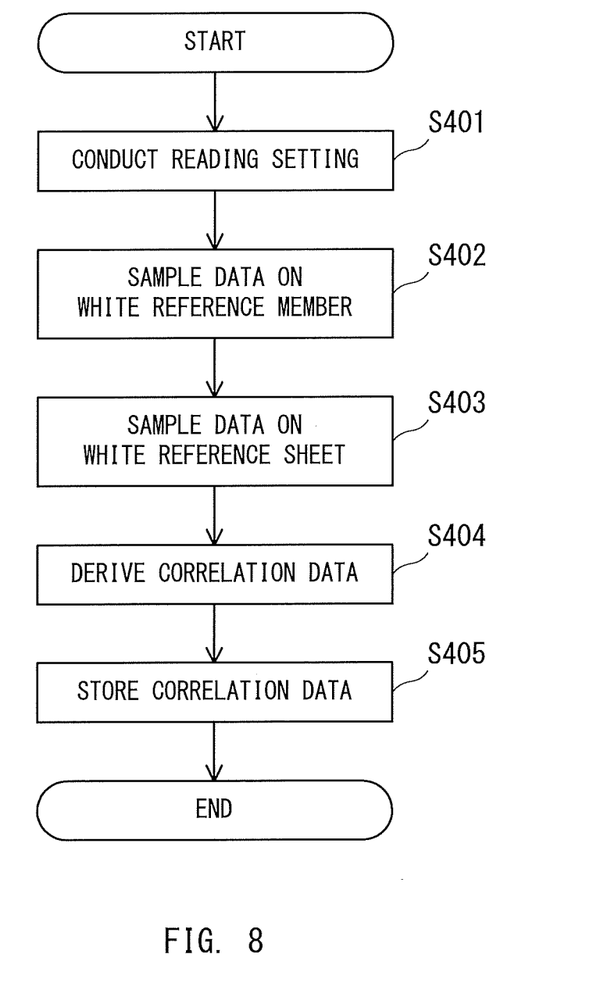
FIG. 8 is a flowchart for illustrating a method of storing correlation data on the illumination brightness distribution data.

FIG. 8 is a flowchart for illustrating a method of storing correlation data on the illumination brightness distribution data in the memory 207 for backup.

The CPU 206 conducts reading setting under a state under which, as illustrated in FIG. 4, the second reading unit 23 is brought into abutment with the platen glass plate 29 (Step S401). The CPU 206 conducts the reading setting based on a reading start signal input from an operation unit (not shown). For example, the CPU 206 causes the light emitter 202 to emit light, and controls the reading using the line sensor 201 based on the reading setting.

The CPU 206 samples data representing the reading result of the white reference member 28 obtained by the second reading unit 23 (Step S402). The CPU 206 stores a sampled data piece X being the reading result of the white reference member 28 in the RAM 205. The data piece X represents the illumination brightness distribution data indicated by, for example, the dotted line of FIG. 3.

After the data on the white reference member 28 is sampled, the operator mounts the white reference sheet 40 as illustrated in FIG. 6B and FIG. 7C so that the white reference portion 41 is arranged at a position on the platen glass plate 29 which is the reading position of the second reading unit 23. After the white reference sheet 40 is mounted, the operator inputs the reading start signal to the CPU 206 through the operation unit. The input causes the CPU 206 to sample data representing the reading result of the white reference portion 41 of the white reference sheet 40 obtained by the second reading unit 23 (Step S403). The CPU 206 stores a sampled data piece Y being the reading result of the white reference portion 41 in the RAM 205. The data piece Y represents the illumination brightness distribution data indicated by, for example, the solid line of FIG. 3.

The CPU 206 derives the correlation data based on the data piece X being the reading result of the white reference member 28 and the data piece Y being the reading result of the white reference portion 41 of the white reference sheet 40 (Step S404). In this case, the CPU 206 reads the data piece X and the data piece Y from the RAM 205. The CPU 206 divides the read data piece Y by the read data piece X, to thereby calculate a correlation data piece Z ($Z=Y/X$). The CPU 206 may hold in advance a table for showing a relationship between the correlation data piece Z and a set of the data piece X and the data piece Y, and may refer to the table to derive the correlation data piece Z. The CPU 206 stores the derived correlation data piece Z in the memory 207 for backup, and brings the processing to an end (Step S405).

The correlation data is stored in the memory 207 for backup at the time of factory shipment of the image reading apparatus 1, the timing when the second reading unit 23 is replaced, the timing when the control board on which the memory 207 for backup is mounted fails or is replaced, or other such timing.

White Reference Sheet According to First Modification Example

Figure 9:
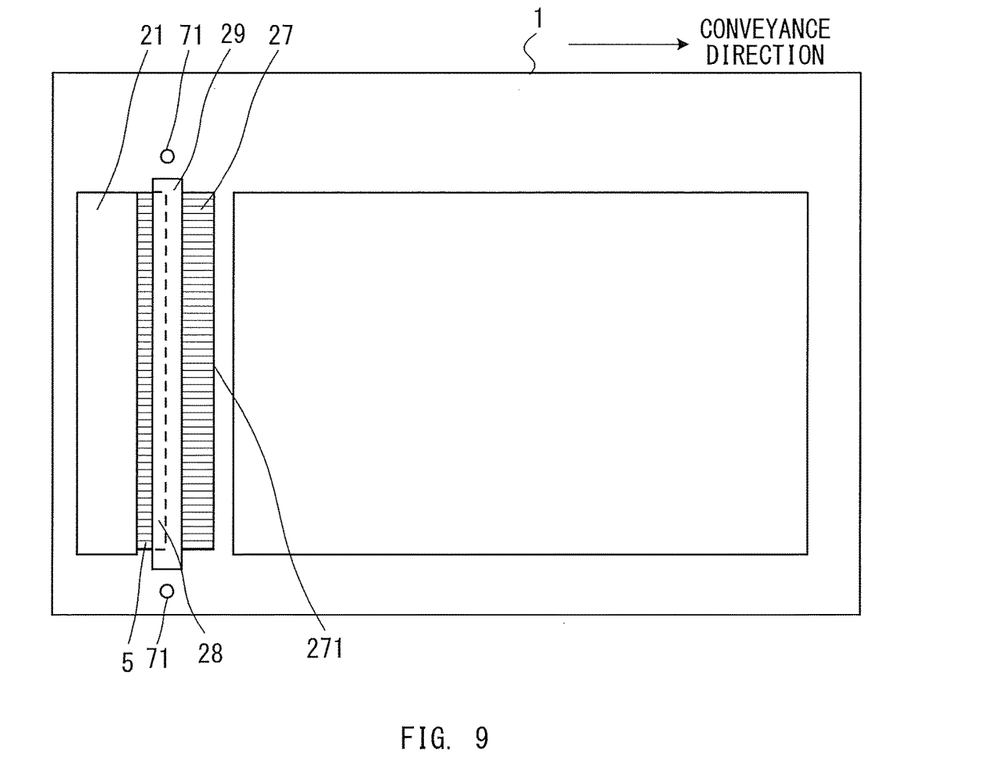
FIG. 9 is an explanatory diagram of a reading position of a second reading unit.

FIG. 9 is an explanatory diagram of the reading position of the second reading unit 23 at which a white reference sheet according to a first modification example of this embodiment is mounted. Protruding members 71 are provided in a main-scanning-direction both ends in the vicinity of the reading position of the second reading unit 23. That is, the protruding member 71 is provided in each of both ends in a direction perpendicular to the conveyance path. The protruding member 71 has a height equivalent to the height of the crest of the slope member 27. The protruding member 71 is a positioning member provided in the vicinity of the reading position.

Figure 10:
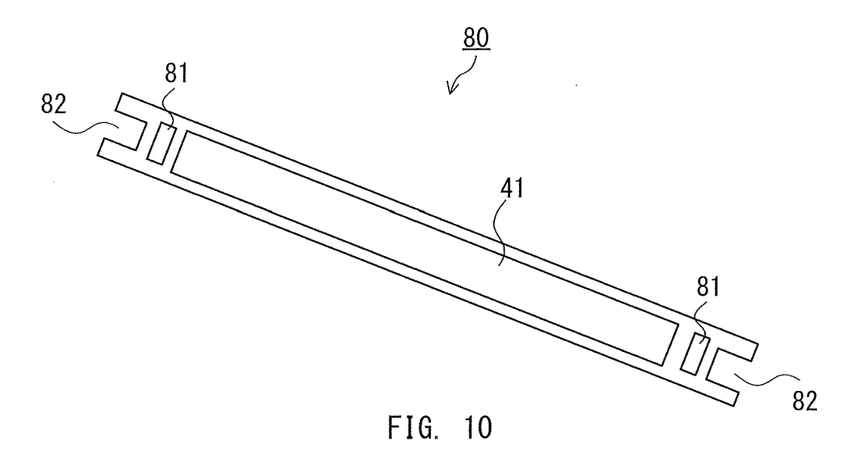
FIG. 10 is a configuration diagram of the white reference sheet.

FIG. 10 is a configuration diagram of the white reference sheet. A white reference sheet 80 has opening portions 81 formed in both ends of the rectangular white reference portion 41 in the longitudinal direction at positions to which the protruding members 50 of the second reading unit 23 illustrated in FIG. 7 are to be brought when the white reference sheet 80 is mounted. The white reference sheet 80 also has a recessed shape formed as an engaged portion 82 for engaging the protruding member 71 in each of both ends of the rectangular white reference sheet 80 in the longitudinal direction. That is, in the white reference sheet 80, the engaged portion 82 having a recessed shape is provided in each of both ends in the direction perpendicular to the conveyance path when the white reference sheet 80 is mounted. At the time of factory shipment of the image reading apparatus 1 or when the second reading unit 23 is replaced, the white reference sheet 80 is mounted at the reading position of the second reading unit 23 by the operator.

Figure 11:
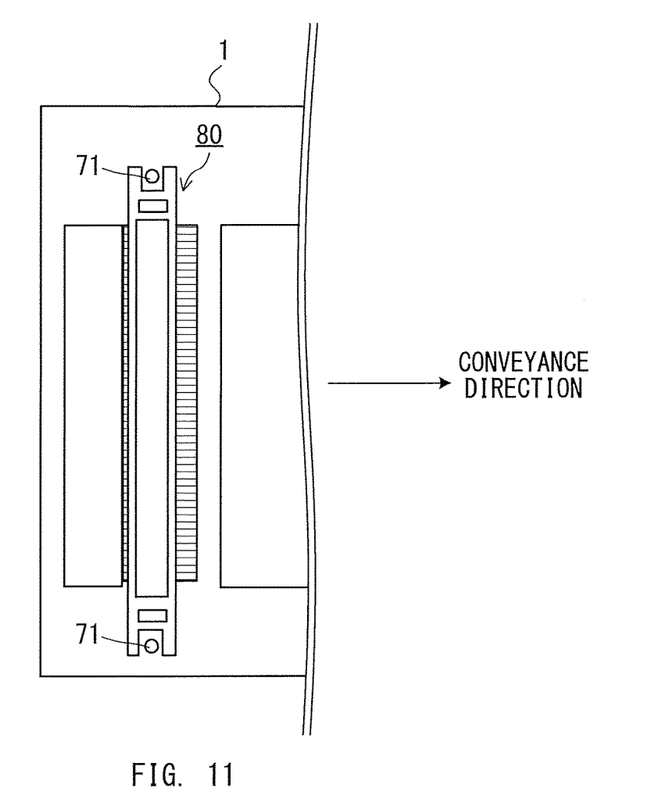
FIG. 11 is an explanatory diagram of the mounted state of the white reference sheet.

FIG. 11 is an explanatory diagram of the mounted state of the white reference sheet 80. The operator determines the position of the white reference sheet 80 (white reference portion 41) by engaging the engaged portion 82 of the white reference sheet 80 with the protruding member 71. The engaged portion 82 is fitted around the protruding member 71. Under this state, the engaged portion 82 has gaps with respect to the protruding member 71 in the main scanning direction and the sub-scanning direction. The white reference portion 41 is also formed to have both a larger transverse dimension and a larger longitudinal dimension than those of the white reference member 28. The opening portion 81 of the white reference sheet 80 is formed so as to prevent the protruding member 50 of the second reading unit 23 and the white reference sheet 80 from interfering with each other when the ADF 10 is closed with respect to the reader 3.

The white reference sheet 80 having such a configuration is positioned by being placed so that the engaged portion 82 is fitted around the protruding member 71. Therefore, the white reference portion 41 is easily arranged at the reading position of the second reading unit 23.

White Reference Sheet According to Second Modification Example

Figure 12:
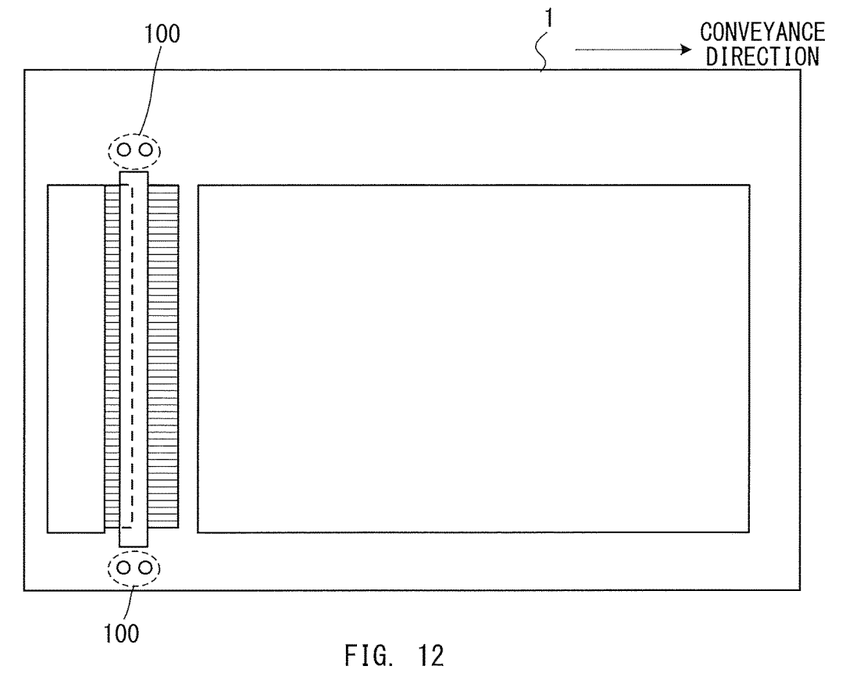
FIG. 12 is an explanatory diagram of the reading position of the second reading unit.

FIG. 12 is an explanatory diagram of the reading position of the second reading unit 23 at which a white reference sheet according to a second modification example of this embodiment is mounted. Two protruding members 100 are provided in the main-scanning-direction both ends in the vicinity of the reading position of the second reading unit 23, respectively. That is, a plurality of protruding members 100 are provided in each of both ends in a direction perpendicular to the conveyance path. The protruding member 100 has a height equivalent to the height of the crest of the slope member 27. The two protruding members 100 are formed in alignment with each other in the conveyance direction of the original D. The protruding member 100 is a positioning member provided in the vicinity of the reading position.

Figure 13:
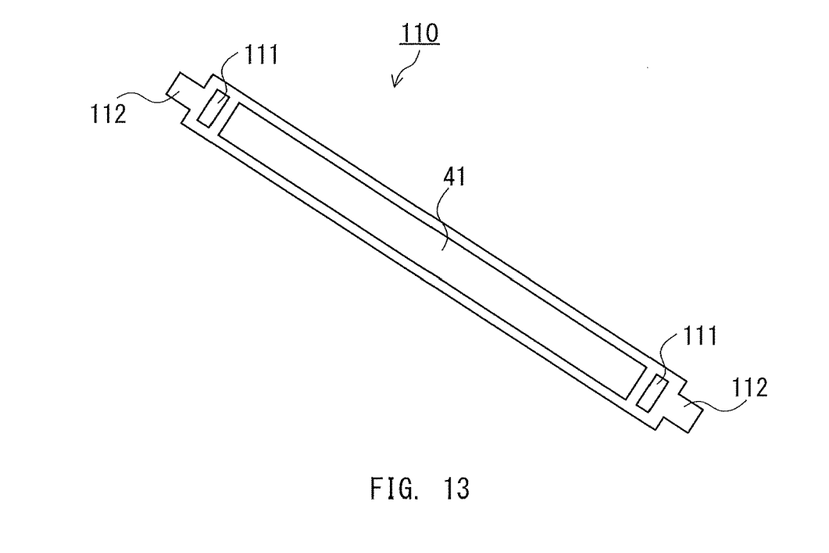
FIG. 13 is a configuration diagram of the white reference sheet.

FIG. 13 is a configuration diagram of the white reference sheet. A white reference sheet 110 has opening portions 111 formed in both ends of the rectangular white reference portion 41 in the longitudinal direction at positions to which the protruding members 50 of the second reading unit 23 illustrated in FIG. 7A to FIG. 7C are to be brought when the white reference sheet 110 is mounted. The white reference sheet 110 also has a protruded shape formed as an engaged portion 112 for being engaged by the protruding member 100 in each of both ends of the rectangular white reference sheet 110 in the longitudinal direction. That is, in the white reference sheet 110, the engaged portion 112 having a protruded shape is provided in each of both ends in the direction perpendicular to the conveyance path. At the time of factory shipment of the image reading apparatus 1 or when the second reading unit 23 is replaced, the white reference sheet 110 is mounted at the reading position of the second reading unit 23 by the operator.

Figure 14:
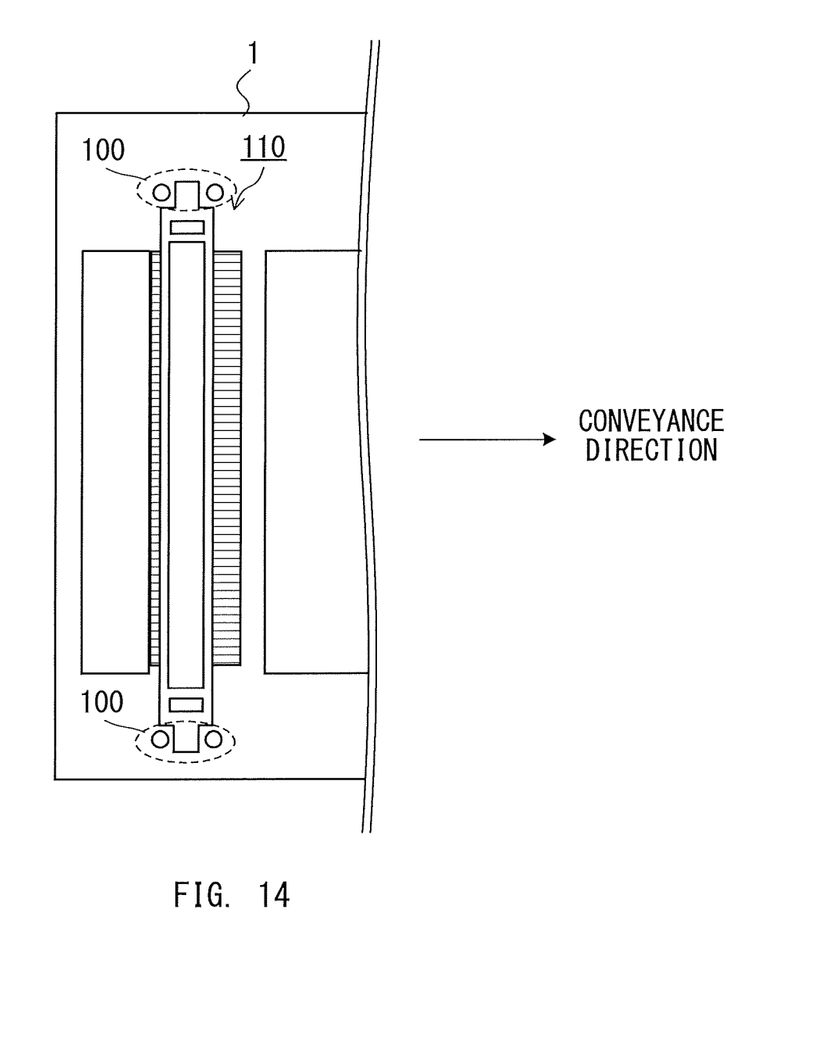
FIG. 14 is an explanatory diagram of the mounted state of the white reference sheet.

FIG. 14 is an explanatory diagram of a mounted state of the white reference sheet 110. The operator determines the position of the white reference sheet 110 (white reference portion 41) by engaging the engaged portion 112 of the white reference sheet 110 with the protruding member 100. The engaged portion 112 is fitted between the protruding members 100. Under this state, the engaged portion 112 has gaps with respect to the protruding member 100 in the main scanning direction and the sub-scanning direction. The white reference portion 41 is also formed to have both a larger transverse dimension and a larger longitudinal dimension than those of the white reference member 28. The opening portion 111 of the white reference sheet 110 is formed so as to prevent the protruding member 50 of the second reading unit 23 and the white reference sheet 110 from interfering with each other when the ADF 10 is closed with respect to the reader 3.

The white reference sheet 110 having such a configuration is positioned by being placed so that the engaged portion 112 is fitted between the protruding members 100. Therefore, the white reference portion 41 is easily arranged at the reading position of the second reading unit 23.

The protruding member 71 of FIG. 9 and the protruding member 100 of FIG. 12 may be configured to retract into the reader 3 after being brought into contact with a lower surface of the ADF 10 when the ADF 10 is closed.

In the above-mentioned image reading apparatus 1 according to this embodiment, the white reference sheet 40, 80, or 110 can be easily mounted at the reading position of the second reading unit 23. The white reference portion 41 is accurately read with the corrugation or warpage being corrected. In this manner, the image reading apparatus 1 can conduct the accurate shading correction by mounting the white reference portion 41 of the white reference sheet 40, 80, or 110 at the reading position even when the white reference member 28 is arranged in a position different from the reading position of the original D. Therefore, the image reading apparatus 1 can suppress an occurrence of image unevenness or other such read image defect.

The present invention can also be applied to a reading kit serving as a failure repair kit including the second reading unit 23 and the white reference sheet 40.

The second reading unit 23 is provided attachably and removably to/from the image reading apparatus 1. When the second reading unit 23 fails, the operator obtains a failure repair kit including the second reading unit 23 and the white reference sheet 40. Then, the operator replaces the second reading unit 23 that has failed by a new second reading unit 23. After that, the operator uses the white reference sheet 40 to perform such operations for the shading correction as described in the above-mentioned embodiment. In this manner, even when the second reading unit 23 fails after the shipment of the image reading apparatus 1, the second reading unit 23 can be replaced and subjected to the shading correction.

Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s). The computer may comprise one or more processors (e.g., central processing unit (CPU), micro processing unit (MPU)) and may include a network of separate computers or separate processors to read out and execute the computer executable instructions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-199329, filed Oct. 7, 2016 which is hereby incorporated by reference herein in its entirety.

What is claimed is:

1. A reading kit, comprising:
   a reading unit configured to read an image of an original being conveyed in a predetermined direction at a predetermined reading position; and
   a white reference sheet comprising a white reference portion to be read by the reading unit and an engaged portion to be engaged with a positioning member, the white reference portion being arranged at the predetermined reading position by engaging the engaged portion with the positioning member.

2. The reading kit according to claim 1, wherein:
   the positioning member comprises a slope member configured to scoop up the original that has passed through the predetermined reading position; and
   the engaged portion of the white reference sheet is configured to be engaged with the slope member.

3. The reading kit according to claim 2, wherein the engaged portion of the white reference sheet has an opening into which the slope member is to be fitted.

4. The reading kit according to claim 1, wherein:
   the positioning member is provided in each of both ends across the predetermined reading position in a direction perpendicular to the predetermined direction for conveying the original; and
   the white reference sheet has the engaged portion formed in each of both ends in the direction perpendicular to the predetermined direction for conveying the original so as to be fitted around the positioning member when the white reference sheet is mounted.

5. The reading kit according to claim 4, wherein the engaged portion is formed to have a recessed shape.

6. The reading kit according to claim 1, wherein:
   the positioning member comprises a plurality of positioning members;
   the plurality of positioning members are provided in each of both ends across the predetermined reading position in a direction perpendicular to the predetermined direction for conveying the original; and
   the white reference sheet has the engaged portion formed in each of both ends in the direction perpendicular to the predetermined direction for conveying the original so as to be fitted between the plurality of positioning members when the white reference sheet is mounted.

7. The reading kit according to claim 6, wherein the engaged portion is formed to have a protruded shape.

8. The reading kit according to claim 1, wherein:
   the reading unit comprises a protruding member configured to secure a conveyance space for the original; and
   the white reference sheet further comprises an opening portion into which the protruding member is to be fitted.

9. The reading kit according to claim 8, wherein:
   the protruding member is provided in each of both ends across the predetermined reading position of the reading unit in a direction perpendicular to the predetermined direction for conveying the original; and
   the opening portion of the white reference sheet is formed at a position to which the protruding member is to be brought when the white reference sheet is mounted, in each of both ends in the direction perpendicular to the predetermined direction for conveying the original.

10. An image reading apparatus, comprising:
    an original tray on which an original is to be stacked;
    a conveyor configured to convey the original one by one from the original tray to a delivery tray along a conveyance path;
    a reading unit configured to read an image from the original being conveyed along the conveyance path;
    a white reference member arranged on a side opposite to the reading unit across the conveyance path and arranged at a position farther from the reading unit than a reading position of the original to be used by the reading unit;
    a positioning member;
    a white reference sheet comprising a white reference portion to be read by the reading unit and an engaged portion to be engaged with the positioning member, the white reference portion being arranged at the reading position by engaging the engaged portion with the positioning member; and
    a controller configured to conduct shading correction on a result of reading the original based on a first reading result of the white reference member and a second reading result of the white reference portion, which are obtained by the reading unit.

11. The image reading apparatus according to claim 10, wherein:
    the positioning member comprises a slope member configured to scoop up the original that has passed through the reading position; and
    the engaged portion of the white reference sheet is configured to be engaged with the slope member.

12. The image reading apparatus according to claim 11, wherein the engaged portion of the white reference sheet has an opening into which the slope member is to be fitted.

13. The image reading apparatus according to claim 10, wherein:
    the positioning member is provided in each of both ends across the reading position in a direction perpendicular to a direction for conveying the original; and
    the white reference sheet has the engaged portion formed in each of both ends in the direction perpendicular to the direction for conveying the original so as to be fitted around the positioning member when the white reference sheet is mounted.

14. The image reading apparatus according to claim 13, wherein the engaged portion is formed to have a recessed shape.

15. The image reading apparatus according to claim 10, wherein:
the positioning member comprises a plurality of positioning members;
the plurality of positioning members are provided in each of both ends across the reading position in a direction perpendicular to a direction for conveying the original; and
the white reference sheet has the engaged portion formed in each of both ends in the direction perpendicular to the direction for conveying the original so as to be fitted between the plurality of positioning members when the white reference sheet is mounted.

16. The image reading apparatus according to claim 15, wherein the engaged portion is formed to have a protruded shape.

17. The image reading apparatus according to claim 10, wherein:
the reading unit comprises a protruding member configured to secure a conveyance space for the original; and
the white reference sheet further comprises an opening portion into which the protruding member is to be fitted.

18. The image reading apparatus according to claim 17, wherein:
the protruding member is provided in each of both ends across the reading position of the reading unit in a direction perpendicular to a direction for conveying the original; and
the opening portion of the white reference sheet is formed at a position to which the protruding member is to be brought when the white reference sheet is mounted, in each of both ends in the direction perpendicular to the direction for conveying the original.

19. The image reading apparatus according to claim 10, further comprising a platen glass plate provided at the reading position,
wherein the white reference sheet is formed to have a thickness larger than a distance between the reading unit and the platen glass plate.

20. The image reading apparatus according to claim 19, wherein the white reference sheet is nipped between the reading unit and the platen glass plate.

21. The image reading apparatus according to claim 10, wherein the white reference portion is formed to be larger than the white reference member in a direction of the conveyance path and a direction perpendicular to the conveyance path.

22. A white reference sheet member which is to be attached to an image reading apparatus, the image reading apparatus including a conveying unit configured to convey a document along a top surface of a transparent member, a reading device configured to read an image of the document conveyed by the conveying unit, a first white reference portion configured to be read by the reading device and disposed on a side opposite to the reading device across the transparent member, and a controller configured to conduct shading correction based on a result of reading the first white reference portion by the reading device,
the white reference sheet member comprising:
a second white reference portion configured to be read by the reading device; and
a positioning portion configured to position the second white reference portion such that the second white reference portion is positioned at a position to be read by the reading device and at a side opposite to the first white reference portion across the transparent member.

23. The white reference sheet member according to claim 22,
wherein a result of reading the second white reference portion by the reading device is used for the shading correction.

24. The white reference sheet member according to claim 22,
wherein positioning of the second white reference portion is performed by the positioning portion and a second positioning portion provided at the image reading apparatus.

25. An image reading apparatus to which a white reference sheet member is to be attached, the image reading apparatus including a conveying unit configured to convey a document along a top surface of a transparent member, a reading device configured to read an image of the document conveyed by the conveying unit, and a first white reference portion configured to be read by the reading device and disposed on a side opposite to the reading device across the transparent member, the white reference sheet member including a second white reference portion configured to be read by the reading device and a positioning portion configured to position the second white reference portion such that the second white reference portion is positioned at a position to be read by the reading device and at a side opposite to the first white reference portion across the transparent member,
the image reading apparatus comprising:
a memory in which information is stored, wherein the information represents relationship between 1) a result of reading the first white reference portion by the reading device and 2) a result of reading the second white reference portion by the reading device with the white reference sheet member attached to the image reading apparatus; and
a controller configured to conduct shading correction based on the information stored in the memory.

26. The image reading apparatus according to claim 25, further comprising a slope member configured to scoop up the document that has passed through a reading position where the reading device reads the document,
wherein the positioning of the second white reference portion is performed by engaging the positioning portion with the slope member.

27. The image reading apparatus according to claim 26, wherein the white reference sheet member has an opening as the positioning portion,
and wherein the positioning of the second white reference portion is performed by fitting the slope member into the opening.

28. The image reading apparatus according to claim 25, further comprising a document feeding unit which includes the conveying unit and the reading device, and comprising a reading unit which includes a second reading device configured to read the document conveyed by the conveying unit,
wherein the document feeding unit is configured to turn with respect to the reading unit and comprises a protrusion configured to secure a space, between the document feeding unit and the reading unit, for the document conveyed by the conveying unit, wherein the white reference sheet member further comprises an opening portion as the positioning portion into which the protrusion is to be fitted, and wherein the positioning of the second white reference portion is performed by fitting the protrusion to the opening portion.

29. The image reading apparatus according to claim 25, further comprising a document feeding unit which includes the conveying unit and the reading device, and comprising a reading unit which includes a second reading device configured to read the document conveyed by the conveying unit, wherein the document feeding unit is configured to turn with respect to the reading unit, and wherein the white reference sheet member is formed to have a thickness larger than a distance between the reading device and the transparent member in a state where the document feeding unit is closed with respect to the reading unit.

30. The image reading apparatus according to claim 29, wherein the white reference sheet member is nipped between the reading unit and the transparent member.

31. The image reading apparatus according to claim 25, wherein the second white reference portion is formed to be larger than the first white reference member in a first direction in which the document is conveyed by the conveying unit and a second direction perpendicular to the first direction.

* * * * *